(12) United States Patent
Irazabal

(10) Patent No.: US 11,409,724 B2
(45) Date of Patent: Aug. 9, 2022

(54) HASHED BALANCED TREE DATA STRUCTURE

(71) Applicant: INTERNATIONAL BUSINESS MACHINES CORPORATION, Armonk, NY (US)

(72) Inventor: Jeronimo Irazabal, Roque Perez (AR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 16/814,207

(22) Filed: Mar. 10, 2020

(65) Prior Publication Data

US 2021/0286792 A1    Sep. 16, 2021

(51) Int. Cl.
*G06F 16/22*     (2019.01)
*H04L 9/32*      (2006.01)
*G06F 16/93*     (2019.01)

(52) U.S. Cl.
CPC .......... *G06F 16/2246* (2019.01); *G06F 16/93* (2019.01); *H04L 9/3236* (2013.01)

(58) Field of Classification Search
CPC .. G06F 16/2246; G06F 16/27; G06F 16/2228; G06F 16/22; G06F 16/316; G06F 16/41; G06F 16/93; H04L 9/3236
See application file for complete search history.

(56) References Cited

U.S. PATENT DOCUMENTS 6,292,795 B1    9/2001 Peters et al.
9,830,324 B2   11/2017 Hunt et al.
9,830,345 B1 * 11/2017 Baars ................... G06F 16/137
2008/0028224 A1 * 1/2008 Pitsos ................... H04L 9/3247
                                                            713/178
2018/0026791 A1    1/2018 Bohli et al.

FOREIGN PATENT DOCUMENTS

KR    20170091248 A    10/2017

OTHER PUBLICATIONS

Nguyen, M.K., et al., "B+Hash Tree: Optimizing query execution times for on-Disk Semantic Web data structures", Nov. 2010, pp. 96-111.

(Continued)

*Primary Examiner* — Hau H Hoang
(74) *Attorney, Agent, or Firm* — Rakesh Roy; Matthew M. Hulihan; Heslin Rothenberg Farley & Mesiti PC

(57) ABSTRACT

Aspects create a tree data structure that indexes a collection of documents present in a data repository at a point in time. The tree data structure includes a plurality of nodes. For each such node, a respective root hash value of that node is determined. The root hash value of a leaf node is determined from hash value(s) for element(s) of that node that are keyed to documents in the collection. The root hash value of a parent node is determined from a root hash value for each of its child nodes. For a given document that is purported to be a target document present in the data repository at the point in time, processing is performed that uses the tree data structure in facilitating verification that the given document is the target document. This includes providing a cryptographic proof to demonstrate whether the given document is the target document.

19 Claims, 5 Drawing Sheets

(56) References Cited

OTHER PUBLICATIONS

"Merkle tree", Wikipedia, retrieved on Jan. 23, 2020 from the Internet URL: <https://en.wikipedia.org/wiki/Merkle_tree>, 5 pgs.
"B-tree", Wikipedia, retrieved on Jan. 23, 2020 from the Internet URL: <https://en.wikipedia.org/wiki/B-tree>, 15 pgs.
"Patricia Tree", Gibhub, retrieved on Jan. 23, 2020 from the Internet URL: <https://github.com/ethereum/wiki/wiki/Patricia-Tree#modified-merkle-patricia-trie-specification-also-merkle-patricia-tree>, 10 pgs.
"Amazon Quantum Ledger Database (QLDB)", retrieved on Jan. 23, 2020 from the Internet URL: <https://aws.amazon.com/qldb/>, 11 pgs.
"BigchainDB", mongoDB, retrieved on Jan. 23, 2020 from the Internet URL: <https://www.mongodb.com/partners/bigchaindb>, 3 pgs.
"Radix tree", Wikipedia, retrieved on Jan. 23, 2020 from the Internet URL: <https://en.wikipedia.org/wiki/Radix_tree>, 8 pgs.
Mell, Peter, et al., "The NIST Definition of Cloud Computing", NIST Special Publication 800-145, Sep. 2011, Gaithersburg, MD, 7 pgs.

\* cited by examiner

HASHED BALANCED TREE DATA STRUCTURE

BACKGROUND

Data in a database can be stored and/or indexed using any of various forms of data structures. One such data structure is a hierarchical tree data structure, often referred to as a tree, which includes parent and child nodes, with some child nodes being leaf nodes of the tree data structure. In particular examples, data of the database is stored in files, blocks, documents, or the like, and index(es) on those components are built as tree data structures. These trees can impart an ordering to the included elements, which helps with tree traversal and efficient identification of selected data in the database. A B-tree is a specific form of tree data structure that is commonly used in connection with databases and file systems.

SUMMARY

Shortcomings of the prior art are overcome and additional advantages are provided through the provision of a computer-implemented method. The method creates a tree data structure that indexes a collection of documents present in a data repository at a point in time. The tree data structure is being stored in memory as a hierarchical data structure that includes comprising a plurality of nodes. The plurality of nodes includes parent nodes and leaf nodes of the tree data structure. The method determines, for each node of the plurality of nodes, a respective root hash value of that node. Each leaf node of the tree data structure includes a respective one or more elements, each element of the one or more elements of the leaf node being keyed to a corresponding document of the plurality of documents. The root hash value of the leaf node is determined as a function of at least a respective hash value for each element of the one or more elements. The hash value for an element is based at least in part on a hash of data of the document to which the element corresponds Additionally, each parent node of the tree data structure is a parent to a respective one or more child nodes of the plurality nodes. The root hash value of the parent node is determined as a function of at least the root hash value for each child node of the one or more child nodes of the parent node. The method also includes storing in each parent node of the tree data structure the root hash value for each of the one or more child nodes of that parent node. The method additionally includes, for a given document that is purported to be a target document of the collection of documents present in the data repository at the point in time, performing processing, using the tree data structure, in facilitating verification that the given document is the target document present as part of the collection of documents in the data repository at the point in time. The performing processing includes providing a cryptographic proof to demonstrate whether the given document is the target document.

Further, a computer system is provided that includes a memory and a processor in communication with the memory, wherein the computer system is configured to perform a method. The method creates a tree data structure that indexes a collection of documents present in a data repository at a point in time. The tree data structure is being stored in memory as a hierarchical data structure that includes comprising a plurality of nodes. The plurality of nodes includes parent nodes and leaf nodes of the tree data structure. The method determines, for each node of the plurality of nodes, a respective root hash value of that node. Each leaf node of the tree data structure includes a respective one or more elements, each element of the one or more elements of the leaf node being keyed to a corresponding document of the plurality of documents. The root hash value of the leaf node is determined as a function of at least a respective hash value for each element of the one or more elements. The hash value for an element is based at least in part on a hash of data of the document to which the element corresponds Additionally, each parent node of the tree data structure is a parent to a respective one or more child nodes of the plurality nodes. The root hash value of the parent node is determined as a function of at least the root hash value for each child node of the one or more child nodes of the parent node. The method also includes storing in each parent node of the tree data structure the root hash value for each of the one or more child nodes of that parent node. The method additionally includes, for a given document that is purported to be a target document of the collection of documents present in the data repository at the point in time, performing processing, using the tree data structure, in facilitating verification that the given document is the target document present as part of the collection of documents in the data repository at the point in time. The performing processing includes providing a cryptographic proof to demonstrate whether the given document is the target document.

Yet further, a computer program product including a computer readable storage medium readable by a processing circuit and storing instructions for execution by the processing circuit is provided for performing a method. The method creates a tree data structure that indexes a collection of documents present in a data repository at a point in time. The tree data structure is being stored in memory as a hierarchical data structure that includes comprising a plurality of nodes. The plurality of nodes includes parent nodes and leaf nodes of the tree data structure. The method determines, for each node of the plurality of nodes, a respective root hash value of that node. Each leaf node of the tree data structure includes a respective one or more elements, each element of the one or more elements of the leaf node being keyed to a corresponding document of the plurality of documents. The root hash value of the leaf node is determined as a function of at least a respective hash value for each element of the one or more elements. The hash value for an element is based at least in part on a hash of data of the document to which the element corresponds Additionally, each parent node of the tree data structure is a parent to a respective one or more child nodes of the plurality nodes. The root hash value of the parent node is determined as a function of at least the root hash value for each child node of the one or more child nodes of the parent node. The method also includes storing in each parent node of the tree data structure the root hash value for each of the one or more child nodes of that parent node. The method additionally includes, for a given document that is purported to be a target document of the collection of documents present in the data repository at the point in time, performing processing, using the tree data structure, in facilitating verification that the given document is the target document present as part of the collection of documents in the data repository at the point in time. The performing processing includes providing a cryptographic proof to demonstrate whether the given document is the target document.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are tree data structures incorporating hash elements, referred to herein as hashed balanced tree data structures, and uses thereof. An example application includes verifying whether a given database element was present in a database at a given time.

In some aspects, approaches described herein lend immutability to a snapshot of a data store, e.g. for demonstrating that a given element was indeed present in a collection of data in a data repository, such as a database or file system, at a given point in time, and without revealing sensitive information of the various data in the collection at that point in time. A practical example is a request for a proof that a given document was present in a collection of documents in a data repository at a given time. Aspects described herein enable the constructing of such proofs to demonstrate these facts about data in the data repository.

With blockchain technology, and more generally cryptographic links generated by cryptographic hash functions, it is possible to construct proofs to demonstrate facts about data, such as ordering, uniqueness, and immutability. A hash tree (often referred to as a Merkle tree) is a data structure that can be used to demonstrate that an element belongs to a set of elements. In blockchain technology, a hash tree can be used to demonstrate that a transaction is included in a block.

Aspects described herein are directed in part to composing together features provided by hash trees with other tree data structures (such as a B− tree or B+ tree, as examples) that organize data of a data store. The result is a tree data structure—referred to herein as a 'hashed' balanced tree data structures—as is described further herein. These can be used to demonstrate that a given element, such as a document, was present as part of a collection of elements, such as a collection of documents, in a data store at a given point in time. While an approach could construct both a tree data structure that indexes the collection of elements and a separate hash tree, any organization of the data as provided by the indexing tree data structure, and the benefits of that organization, may be lost when utilizing the hash tree to establish membership in the set of elements, on account of the separation between the two. Hash trees are generally not optimized for searching and they are constructed from a fixed set of elements with the expectation that the elements are not being modified and elements are not being added or removed.

Accordingly, aspects described herein create a hierarchy of hash trees composed with an indexing tree data structure to provide a 'hashed balanced tree data structure' that captures both a snapshot of the state of the source data as well as the organization of that source data reflected by the index. This can enable efficient searching and other functions, such as verifying that a given piece of data is presence in the snapshot.

Figure 1:
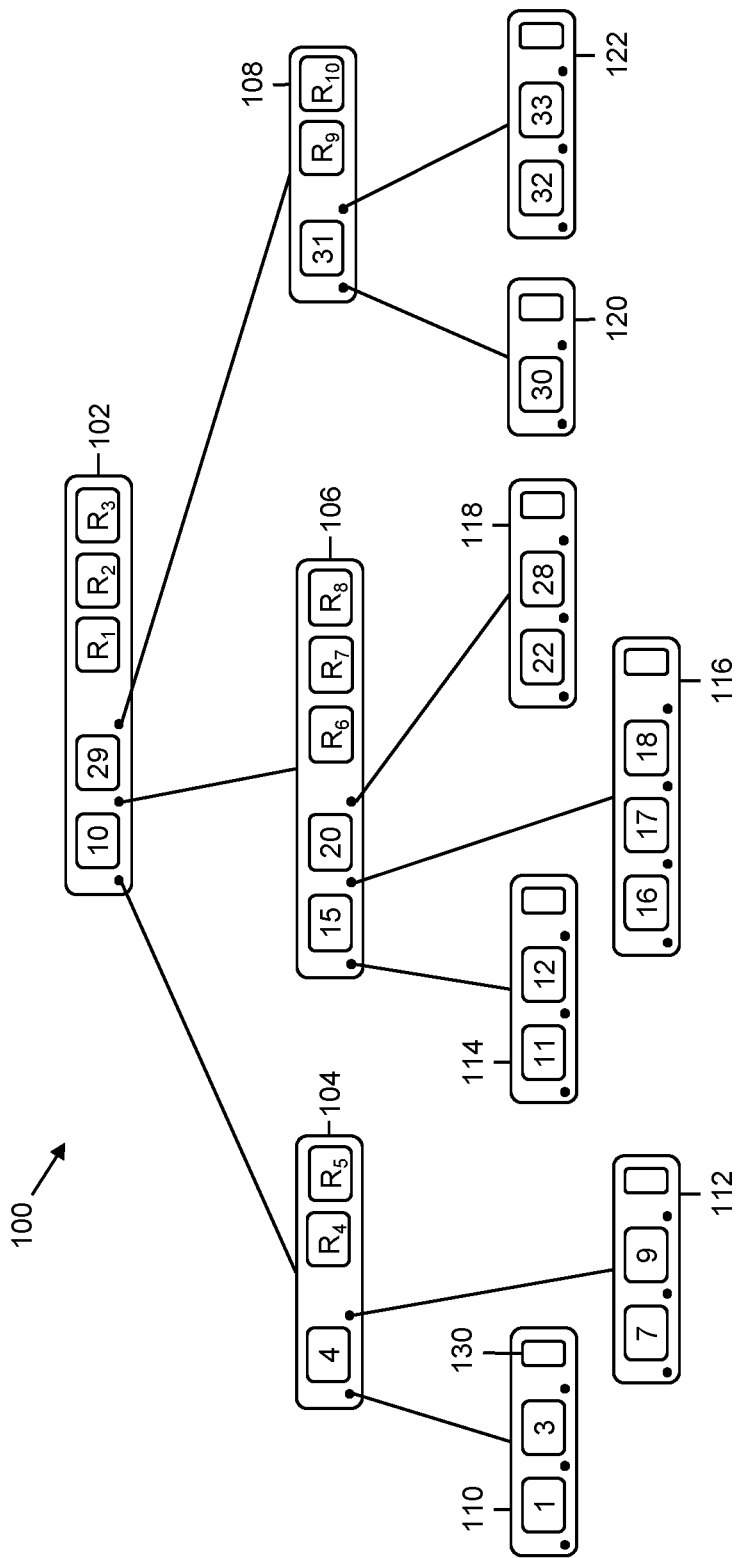
FIG. 1 depicts an example tree data structure in accordance with aspects described herein.

An example hashed balanced tree data structure is depicted and described with reference to FIG. 1. The example of FIG. 1 presents a combination of a B-tree with aspects of a hash tree. For the sake of simplicity, and not as a limitation on the invention, the example data store in which the source data is stored is a database. The database itself has a hash state, representing a hash of the state of the database at a given time. This is a function of the data stored in the database at the given time and can be exported at the time of capturing a snapshot or backup of the database, for instance.

A tree data structure in accordance with aspects described herein can be used in many different applications, not just databases. File systems and other data repositories are possible. Examples described herein use a database as the example data store and documents as example data elements/objects of that database. Other examples of data objects are possible, such as blocks, files, or any unit of data.

The hash state of the database can be continually changing as documents and/or metadata thereof are modified, and as documents are added or removed. This is because the hash state may be a function of (at least) data of the documents, including metadata thereof, that are present in the database. Any given document might contribute a cryptographic "proof" hash or digest representing the state of the document at a given time. The collection of these proofs across the documents in a collection can inform an overall state (hash) of that collection at that time. At any later point in time, it can be verified whether the database is in a desired state, such as the same state as it was previously, at that earlier time. If the database changed between the earlier time and the later time, for instance a document was modified, which would thereby cause the hash for the document to change, or document(s) are added/deleted, then the database has changed. This will result in a changed hash state of the overall database that will not match the earlier hash state.

The hash state of the database at a given point in time can be exported by a server as a hash value and 'signed', for instance encrypted using a private cryptographic key. This encrypted hash can be shared by the server and decrypted by a client using the public cryptographic key corresponding to the private key. This enables a client entity having access to the public key to obtain the hash as it was exported by the server. The client entity can then compare that hash with one the entity computes based on, for instance hashing document(s) that purport to have been included in the collection of documents of the database at the given point in time when the hash state was exported by the server.

Referring by way of example to FIG. 1, depicted is an example tree data structure in accordance with aspects described herein. The tree data structure 100 is created and indexes a collection of documents present in a data repository, such as a database, at a point in time. The tree data structure can be stored in memory as a hierarchical data structure that includes a plurality of nodes, such as is graphically depicted in FIG. 1. The plurality of nodes include parent nodes and leaf nodes of the tree data structure. Leaf nodes are nodes with no children. In FIG. 1, nodes 110, 112, 114, 116, 118, 120 and 122 are leaf nodes. Leaf nodes are also child nodes since they each have a parent node. A parent may have more than one child. Nodes 104, 106 and 108 are parent nodes. Node 104 has two children nodes, 110 and 112, node 106 has three children nodes, 114, 116 and 118, and node 108 has two children nodes, 120 and 122. Node 102 is the root node of tree 100. It is also a parent node to child nodes 104, 106 and 108, and a grandparent node to the leaf nodes of the tree. Nodes 104, 106 and 108 are therefore simultaneously child nodes to node 102, and parent nodes to their respective child nodes.

Tree 100 is an example index to a collection of documents stored in the database. In this example, certain elements within nodes of the tree 100 are keyed to specific documents in the collection. For instance, each key is indicative of a specific document in the collection, and no document in the collection is represented by more than one key. Node 110 includes two such elements, labeled 1 and 3, corresponding to keys 1 and 3 respectively. The key can be any unique way of identifying a document, and is not expected to change even as document data changes. In this example, a key is the unique document ID of the document it represents. It is noted that node 110 also includes an empty list 130, which is explained further below.

The specific ordering of the documents in the tree can follow any desired ordering/organization for the documents in the collection. As noted, a B-tree is an example of a known tree type for organizing data. In this example, the documents are ordered in ascending document ID order progressing from left to right, lowest level (leaf) to highest level (root).

The creation of the tree 100 can create the overall structure of the tree, including the nodes and relation therebetween (including links, as represented by the black dots within nodes in tree 100 and arrows pointing to child nodes). A process also determines, for each node of the plurality of nodes of the tree, a respective root hash value of that node. The root hash value for a node is a unique hash value that can represent the state of that node. Thus, for any node of tree 100, a corresponding root hash value can be determined.

$R_0$ refers to the root hash value for the root node of the tree (node 102). This $R_0$ value also represents the hash state of the collection of documents. Each parent node stores the root hash values for each of its child nodes. Thus, node 102 stores the root hash values, $R_1$, $R_2$, and $R_3$, for its child nodes 104, 106, and 108, respectively. These root hash values $R_1$, $R_2$ and $R_3$, represent the hash states of the sub-trees rooted at those nodes 104, 106 and 108, respectively. In other words, $R_1$ represents the hash state of the sub-tree rooted at node 104 which, as is explained herein, if a function of at least the documents represented by that sub-tree.

Following this structure, node 104 includes the root hash values $R_4$ and $R_5$ for its child nodes 110 and 112, node 106 includes the root hash values $R_6$, $R_7$ and $R_8$ for its child nodes 114, 116, and 118, and node 108 includes the root hash values $R_9$ and Rio for its child nodes 120 and 122.

Since leaf nodes 110, 112, 114, 116, 118, 120 and 122 by definition do not have any children, none include any root hash values for any such children nodes, hence empty element (e.g. 130 of node 100) may be provided to represent an empty list of root hash values. If a $4^{th}$ level were added to this tree such that children were added any current leaf nodes, then these empty lists would be populated accordingly with the root hash values of the children of the respective nodes.

Regarding the leaf nodes of tree 100, each leaf node includes a respective one or more elements, each being keyed to and representing a corresponding document of the plurality of documents of the collection. Thus, node 110 includes two such elements, labeled 1 and 3, which are keys for documents 1 and 3 (in this example) of the collection of documents. Similarly, node 112 has elements keyed to documents 7 and 9, node 114 has elements keyed to documents 11 and 12, node 116 has elements keyed to documents 16, 17 and 18, node 118 has elements keyed to documents 22 and 28, node 120 has an element keyed to document 30, and node 122 has elements keyed to documents 32 and 33. Any given document in the collection may be represented by at most one such element keyed to it. 'Key' is used here not necessarily in the cryptographic sense, but rather in the identification sense to identify a given document.

In this particular example, non-leaf nodes of the tree (i.e. nodes 104, 106, 108 and 102) also include elements keyed to documents (i.e. 4, 10, 15, 20, 29, and 31). Thus, in this particular tree, non-leaf nodes index documents of the collection, though in other example tree data structures, only leaf nodes contain such elements and the parent nodes include information for traversing down the tree to arrive at a given leaf node for some identified document.

Each element keyed to a given document can store a reference (e.g. memory address, location, offset, link, uniform resource locator, etc.) to the given document. The element can be identified in the tree through a traversal/search or other means, and the document can be accessed via that reference.

In addition, a hash value for each element keyed to a corresponding document can be determined. The hash value for the element can represent, or be used in conjunction with other information to represent, the state of the document keyed-to by that element, at a given time. In this regard, the hash value for the element can be a function of at least some data of that document. Data of that document can be used in the generation of a document hash or digest, which generation may be configured to produce a unique hash representative of the current state of that particular document. That digest, or some function applied thereto, for instance a function of the digest together with the key, a current time, or any other values, can produce the hash value for the element keyed to that document. If the document data changes, then a proper hash function would produce a different digest, which would in turn result in a different hash value for the element that is keyed to that document. In this manner, a change to the document is to result in a change to the hash value for the element representing that document in the tree 100. This in turn affect other hash values of the tree, as explained herein.

The root hash value for any given leaf node can be determined as a function of at least the hash value(s) for these element(s), of that leaf node, keyed to documents in the collection. Therefore, the root hash value of node 118 can be a function of (at least) the hash values for elements 22 and 28. As noted, the hash values for these elements can be based at least in part on a hash of data of those documents to which the elements correspond (i.e. documents 22 and 28 in this example). In some examples, the hash value for an element is determined based at least on data of the document to which the element corresponds as well as a time at which the document was stored to the data repository.

Any non-leaf node of a tree is a parent node, and all parent nodes except the root node of the tree (e.g. node 102) are also a child node to another parent node. For parent nodes of a tree data structure in accordance with aspects described herein, each parent node of the tree data structure is a parent to a respective one or more child nodes, and the root hash value of the parent node can be determined as a function of at least the root hash value(s) for the child node(s) of those one or more child nodes of the parent node. Looking at node 106 of FIG. 1, it is a parent to child nodes 114, 116 and 118 (which happen to also be leaf nodes), having root hash values $R_6$, $R_7$ and $R_8$, respectively. The root hash value for node 106 can therefore be a function of (at least) $R_6$, $R_7$ and $R_8$. In the particular case of tree 100 where non-leaf nodes contain not only root hash values of their children but also elements keyed to documents of the collection, then the root hash values of those non-leaf nodes can be a function further of the hash values for those elements. Thus, the root hash value for node 106 can be a function of both the hash values for elements 15 and 20, and the root hash values $R_6$, $R_7$ and $R_8$ for child nodes 114, 116 and 118 of node 106.

Similarly, the root hash value ($R_0$) of the root node 102 of the tree data structure can be a function of the hash values for elements 10 and 29 and the root hash values $R_1$, $R_2$ and $R_3$. In accordance with this, the hash values for the elements representing the documents from lower-level nodes affect the root hash values for upper-level nodes in the lineage to the root of the tree. The root hash value for node 102, which represents a hash for the collection of documents at the point in time, is a function ultimately of, inter alia, the hash values for each of the elements keyed to documents, which hash values are themselves based on the data of those documents.

Figure 2:
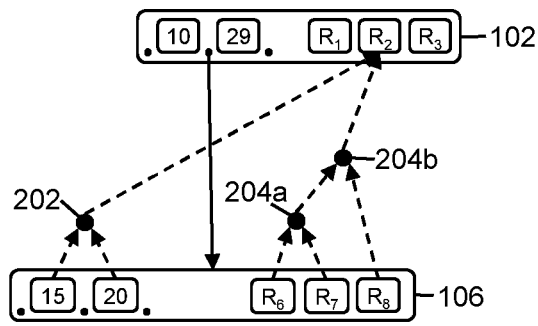
FIG. 2 depicts an illustration of the computation and storage of a root hash value of a node of a tree data structure, in accordance with aspects described herein.

FIG. 2 depicts an illustration of the computation and storage of a root hash value of a node of a tree data structure, in accordance with aspects described herein. The example of FIG. 2 presents nodes 102 and 106 from FIG. 1. Node 106 is a child of node 102. Node 106 includes elements labeled 15 and 20, which are keys to documents (say document with docID 15 and document with docID 20) represented by those elements. Node 106 also includes $R_6$, $R_7$ and $R_8$, which, as explained above, are the root hash values for nodes 114, 116 and 118, respectively, of FIG. 1.

The root hash value of node 106 is a function of the documents (keys 15 and 20) represented by of that node as well as the root hash values $R_6$, $R_7$ and $R_8$ of the child nodes. In this example, the hash values for elements 15 and 20 are combined using a function to produce a root hash 202 of the elements. The root hash values of the child nodes are combined to produce an overall children root hash 204b. Here, root hash values $R_6$ and $R_7$ are combined using a function to produce a children root hash 204a, which is then combined with the root hash value $R_8$ using a function to produce the overall children root hash 204b. The hashes 202 and 204b are then combined using a function to produce the root hash value, $R_2$, for node 106, which is stored in node 102. Same or differing functions may be used for each of these steps of combining different hashes, and FIG. 2 depicts just one example in which to determine a root hash value of node 106 based at least in part on the hashes for its elements 15, 20 and root hash values $R_6$, $R_7$ and $R_8$; many other approaches are possible.

The root hash value for a node (e.g. 106) is therefore determined based at least in part on the node's content. If this node content is modified, for instance a hash for an element (15 or 20, based on document data changing for instance), or any root hash value of a child of node 106 changes (again, based on document data changing or documents being added or removed, for instance), this this will affect the root hash value calculated for node 106.

In particular example tree data structures described herein, non-leaf nodes of the tree data structure may not hold a direct reference to any document(s) of the collection of documents and may also not hold document data (instead, only leaf nodes may hold references to documents or document data itself). In these situations, the non-leaf nodes may instead hold information, such as document identifiers and root hash values of child nodes, for expediting tree data structure traversal, searching, and cryptographic proof construction as described herein. In other words, some types of tree data structures are designed for a search to traverse down the levels of the tree in an efficient manner in order to arrive at a specific leaf node which then references to (or contains) target document data. In these cases, the root and inner (non-leaf) nodes of the tree data structure may include data that identifies specific documents or document identifier ranges and enables the search software to follow the proper branch to arrive at the leaf node referencing a desired document, but these nodes ultimately do not point directly to, or contain, document data. Parent nodes of other example tree data structures, such as tree 100 of FIG. 1, do contain references to document data or document data itself.

The tree data structure can be updated at appropriate times and/or based on appropriate events. As described, the tree data structure can represent a snapshot of a collection of documents at a given point in time. Based on adding or removing document(s) from that collection, the tree data structure can be updated (or a new version of the tree data structure created using the updated collection). Additionally or alternatively, if data of a document of the collection changes, then the hash of the element keyed to that document will change, and this will affect node(s) of the tree data structure.

In the particular example of a document being added or removed from the collection, this results in an element in a node of the tree being added or removed as the case may be, or a new tree data structure being created. In this situation, or if a document represented by an element in a node is changed, then the tree can be updated. As part of this, the node in which the element corresponding to the added, removed, or changed document can identified. The tree data structure can then be updated. After identifying that node, the update can determine a new root hash value of the identified node. Since the root hash value of any node is a function of the root hash values of its children node(s), then this new root hash value for the identified node will affect the root hash value of each parent node from which the identified node descends. Consequently, the updating of the tree can determine a respective new root hash value for each parent node, of the tree data structure, from which the identified node descends.

To illustrate the above, node 116 of FIG. 1 includes elements 16, 17 and 18. Assume these keys are document identifiers for documents 16, 17 and 18, respectively. If the data of one of these documents 16, 17, or 18 changes, or if one of these documents is removed from the collection such that the corresponding element is removed from node 116, or if a new document is added to the collection such that a corresponding element is added into this node 116, then the root hash value $R_7$ for node 116 will change. This is because the root hash value $R_7$ of node 116 is a function of at least the hashes of the node's included elements that are representative of documents of the collection. Node 106 is a parent to node 116, and root node 102 is a grandparent to node 116. The change to $R_7$ affects the root hash value $R_2$ for node 106 because $R_7$ is stored in node 106 and $R_2$ is partly a function of this stored value $R_7$. Similarly, the resulting change to $R_2$ affects the root hash value $R_0$ for node 102 because $R_2$ is stored in node 102 and $R_0$ is partly a function of this stored value $R_2$. The change in $R_7$ does not, in this example, affect the root hash value of any node not in the lineage between the root node 102 and node 116.

The tree data structure can be maintained by a server, such as a server of, or in communication with, a database/database system. The server could be responsible for creating, obtaining, managing, etc. a snapshot or backup of the database/collection of documents at a given time. The server can create/update the tree data structure and determine the root hash value $R_0$ of the tree's root node whenever a snapshot or backup is performed. Furthermore, this root hash $R_0$ can be shared with an auditor or any other entity to represent the state of the collection of documents of that snapshot/backup at the point in time of the snapshot/backup. The $R_0$ value can serve as a proof used later to prove that a given collection of documents matches to a collection from which the $R_0$ value was generated.

Additionally or alternatively, the tree data structure can be used in verifying whether a given document is present in a given collection of documents at a given point in time. As a basic example, assume that a collection of documents is stored in a data store of a server that also creates and stores, as an index of the documents, a hashed balanced tree data structure in accordance with aspects described herein. Assume that a document with identifier "9", and identified by a key of 9, is a document in the collection of documents at a given point in time, which could be a current time or a past time, and that the root hash values as described herein are calculated for the nodes of the tree for that given point in time. A client holding a given document purporting to be the 'target' document 9 of the collection at that point in time can undertake a verification to check whether given document 9 is in fact the target document 9 that was present in the collection of documents of the data store. The client can reach out to the server and request data that will enable the client to verify whether the given document 9 is the target document 9. What the server returns is referred to herein as a cryptographic proof. Based on a hash mechanism agreed-upon by the server and the client to hash a document and produce a hash value, the client can use that hash value and the cryptographic proof to prove whether the given document 9 and the target document 9 are the same.

Referring to FIG. 1, the key "9" appears in node 112. The cryptographic proof that the server sends can be the hash values which would enable the client to compute, in part based on data of the purported document 9, a root hash value of the tree, i.e. which should match to $R_0$ if purported document 9 is the actual document 9. Since the client holds the purported document 9, the client can be expected to be able to produce the hash value for element 9 in tree 100. The particular mechanism that the server uses to compute a root hash value for a node can be known to the client, thereby enabling the client to compute the root hash value of a node if it has the necessary information. Therefore, the server can return, as part of the cryptographic proof whatever, hash(es) are needed for the client to determine the root hash value for node 112. Here, this can include the hash value for element 7, which is the other element of node 112 keyed to a document of the collection. This enables client to compute $R_5$, a root hash value for node 112. In addition, the server can return as part of the cryptographic proof whatever information is needed for the client determine a root hash value for node 104, given that the client can generate the $R_5$ value. This therefore includes the hash value for element 4 and root hash value $R_4$, which is the root hash value of the other child node (110) of node 104. With that information, the client can produce a root hash value $R_1$ for node 104. Moving up to the next, and highest, level of the tree, to compute the root hash value $R_0$ of node 102, i.e. the root hash for the whole tree, the client would also need (and the server can therefore include in the cryptographic proof) the root hash values, $R_2$ and $R_3$, for node 102's other children 106 and 108, as well as the hash(es) for elements 10 and 29. In this latter regard, the cryptographic proof could include the hash values for both elements 10 and 29, or could include just the combined root hash of those two elements (see, e.g., 202 in FIG. 2). Either way, the client can be expected to know how to compute a purported $R_0$ from that information. With the cryptographic proof provided by the server, and after the client creates, using the purported document 9, a hash value that is to correspond to the proper hash value for element 9 in the tree data structure, the client can determine a root hash $R_0'$. This can be compared to the real root hash $R_0$ made available to the client by the server. If they match, then the client is assured that the purported document 9 is the document 9 that was included in the collection at the time of the snapshot. As mentioned above, the time of the snapshot could be the current time, i.e. of the client request for a cryptographic proof for a document that is purported to be a current document in the collection. The hash mechanism that is used can be tailored to avoid collisions given the particularities of the data/document involved.

The client need not necessarily know the structure of the tree data structure in order to use the cryptographic proof. For instance, the client and server can use an agreed-upon cryptographic proof syntax, hash order, or the like so that the client knows how to properly apply the provided hash values of the cryptographic proof to the functions that determine the root hash values of the nodes, and ultimately compute a root hash for comparison to the true $R_0$.

Accordingly, for a given document that is purported to be a target document of a collection of documents present in a data repository at a point in time, a system, such as a server, can perform processing, using the tree data structure, in facilitating verification that the given document is the target document present as part of the collection of documents in the data repository at the point in time. This processing can work in conjunction with processing of the client, and include providing a cryptographic proof to the client to demonstrate whether the given document is the target document. The server can be the same system or a different system from that which created the tree data structure. The tree data structure could be created dynamically when a request is received. In any case, the cryptographic proof can be constructed and provided based on a request from the client device holding the given document to be verified. The client can receive the cryptographic proof and use it in determining whether the purported document is the actual document of the collection.

A node of the tree data structure that has an element that is keyed to the target document can be identified. The provided cryptographic proof can include hash values for nodes of the tree data structure, these hash values being those which, together with the hash value for the element that is keyed to the target document, enable calculation of a root hash value of the root node. Then, if the client holds the actual document of the collection, it should be able to produce the hash value to match that hash value of the actual element, in the tree, keyed to that document. With the information provided as part of the cryptographic proof, the client has all the information needed to compute a purported $R_0$ value that is to match the true root hash ($R_0$) for the tree data structure. If instead the purported document is not the same as the document, from the collection, that it purports to be, then the hash value computed from the document data will not match the hash value of the element keyed to the actual document of the collection. The client-computed root hash value of the identified node will be wrong and that will propagate up the level(s) of the tree to result in a wrong purported root hash $R_0$.

The hash values of the cryptographic proof can also include, for each parent node, of the tree data structure, from which the identified node is a descendent, one or more root hash values for the one or more child nodes, of that parent node, that is/are not also a parent node from which the identified node descends. In cases where the identified node (having the element keyed to the target document) includes other element(s) keyed to other documents of the collection. In that case, the cryptographic proof includes one or more hash values for one or more elements, other than the element that is keyed to the target document, of the identified node.

Where non-leaf nodes of the tree data structure include elements that reference or include documents therein, such that the root hash values of those nodes are affected by the hashes of those elements, the cryptographic proof can include, for each parent node, of the parent nodes from which the identified node is a descendent, hash value(s) for such element(s) of the parent node. Additionally, where the identified node is a non-leaf node that has at least one child node, the cryptographic proof can further include root hash value(s) for the at least one child node of the identified node.

In a given state of the database of documents, the cryptographic proof would contain a given set of hashes. Modification of any document's data results in a different root hash value of the element keyed to the document as well as the root hash value for that node. This in turn affects the root hash value of any parent node from which the node descends, and ultimately the root hash $R_0$ of the tree. Changing data of a document therefore changes hash value(s) for the tree. Based on a given document being different from the target document, the provided cryptographic proof will demonstrate to the client that the given document is not the target document and the verification that the given document is the target document present as part of the collection of documents in the data repository at the point in time will fail.

As noted, the tree data structure may or may not store the document data itself. In this case, the collection of documents are stored in the tree data structure, and, for each node of the tree data structure that has one or more elements corresponding to one or more documents of the collection of documents, each element of the one or more elements of that node includes the document data of the document to which the element respectively corresponds. This would enable hashing of document data to take place without having to follow a reference to obtain that data. As an alternative, the tree may refer to document data which is stored elsewhere and a reference or link is followed to the document data to perform any hashing thereof.

In general, a method is provided by aspects described herein to formally demonstrate a given piece of data is present in a source data structure/store via the creation of a hierarchy of hash trees taking into account how data is organized into the source data structure/store. The hierarchy of hash trees can be formed by a tree data structure, such those described herein.

Additionally, cryptographic proof(s) can be constructed to demonstrate a set of documents were present in a collection at a given time. That is, it is not necessary that one cryptographic proof is needed per document. A way of implementing this could be as is done with a cryptographic proof in a binary hash trees.

As one example, if two documents were up for verification, the server could return a (single) cryptographic proof with the hashes needed for the client to determine the root hash value for the root node of the tree.

Figure 3:
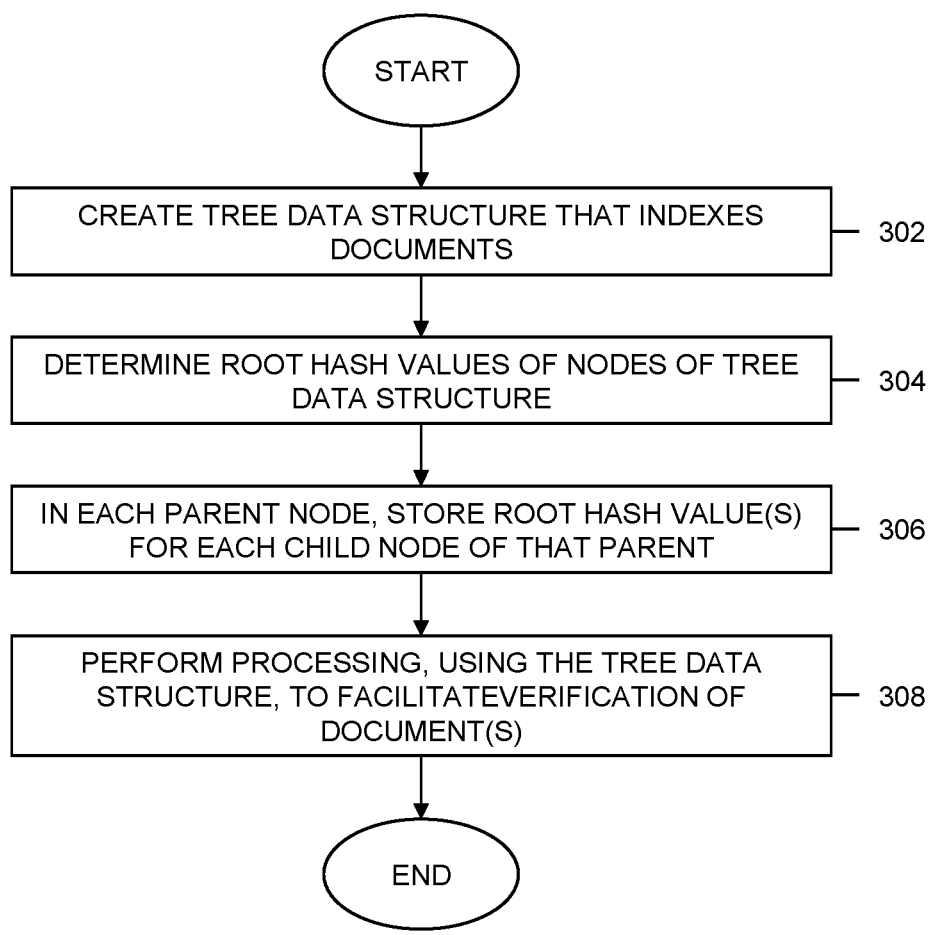
FIG. 3 depicts an example process for document verification using a hashed balanced tree data structure, in accordance with aspects described herein.

FIG. 3 depicts an example process for document verification using a hashed balanced tree data structure, in accordance with aspects described herein. In some examples, the process is performed by one or more computer systems, such as those described herein, which may include one or more server(s) of a database system, file server(s), and/or one or more other computer systems.

The process begins by (302) creating a tree data structure that indexes a collection of documents present in a data repository at a point in time. the tree data structure is stored in memory as a hierarchical data structure that includes a plurality of nodes. The plurality of nodes includes parent nodes and leaf nodes of the tree data structure. The process also (304) determines, for each node of the plurality of nodes, a respective root hash value of that node.

Each leaf node of the tree data structure can include a respective one or more elements, with each element of these one or more elements of the leaf node being keyed to a corresponding document of the plurality of documents. The root hash value of the leaf node can be determined as a function of at least a respective hash value for each element of those one or more elements. Additionally, the hash value for an element can be based at least in part on a hash of data of the document to which the element corresponds/is keyed to. In addition to this, the hash value for an element can be determined based at least on data of the document to which the element corresponds and also a time at which the document was stored to the data repository.

Any non-leaf node is a parent node, and all parent nodes except the root node of the tree data structure is also a child node. Each parent node of the tree data structure is a parent to a respective one or more child nodes of the plurality of nodes. The root hash value of the parent node can be determined as a function of at least the root hash value for each child node of the one or more child nodes of the parent node. In some cases, non-leaf nodes of the tree data structure do not hold a direct reference to any documents of the collection of documents and do not hold document data, but they do hold, e.g., document identifiers and root hash values for expediting tree data structure traversal, searching, and cryptographic proof construction.

The process also (306) stores, in each parent node of the tree data structure, the root hash value for each of the one or more child nodes of that parent node. The tree data structure is rooted at a root node of the tree data structure and the root hash value for the root node represents a hash for the collection of documents at the point in time.

The tree data structure can facilitate document verification. For a given document that is purported to be a target document of the collection of documents present in the data repository at the point in time, the process of FIG. 3 can continue by (308) performing processing, using the tree data structure, in facilitating verification that the given document is the target document present as part of the collection of documents in the data repository at the point in time. This can be undertaken based on receiving a request in which a client identifies the target document, of the collection, against which the given/purported document is being verified. The performing processing can include providing a cryptographic proof that to demonstrate whether the given document is the target document.

An identified node of the tree data structure has an element that is keyed to the target document. The provided cryptographic proof can include a plurality of hash values for nodes of the tree data structure, the plurality of hash values being those which, together with the hash value for the element that is keyed to the target document, enable calculation of a root hash value of the root node, i.e. $R_0$. If the document held by the client really is the target document, then the client will be able to produce the correct hash for that 'element representing the target document', which would then be used with the hashes of the cryptographic proof to compute an '$R_0$' value for comparison to the real $R_0$ for the tree data structure. If instead the document held by the client is not the target document, then the hash value computed therefrom, which would otherwise match the hash value for the element that is keyed to the target document, will not match, and the client-computed root hash value of the identified node will be wrong, which will produce a root hash of the tree that does not match the real $R_0$.

The plurality of hash values can include, for each parent node, of the tree data structure, from which the identified node is a descendent, one or more root hash values for one or more child nodes, of that parent node, that is not also a parent node from which the identified node descends. Where the identified node includes other element(s) keyed to other documents, then the plurality of hash values that form the cryptographic proof can include one or more hash values for one or more elements, other than the element that is keyed to the target document, of the identified node.

In a scenario where inner nodes of the tree data structure, like the leaf nodes, point to or include data of documents, then the cryptographic proof can include not only root hash values for children nodes of those inner nodes but also hashes for elements of those inner nodes. Thus, non-leaf nodes of the tree data structure can include a respective one or more elements each being keyed to a corresponding document of the plurality of documents, and the plurality of hash values of the cryptographic proof can include, for each parent node of the parent nodes, of the tree data structure, from which the identified node is a descendent, one or more hash values for one or more elements of the parent node.

When the identified node is a non-leaf node having at least one child node, the plurality of hash values of the cryptographic hash can further include one or more root hash values for the at least one child node of the identified node.

The tree data structure can be updated, for instance based on a change that performs adding, removing, or changing a document of the collection of documents. The updating of the tree data structure can include identifying a node of the tree data structure having an element to which the document corresponds, determining a new root hash value of the identified node, and determining, a respective new root hash value for each parent node, of the tree data structure, from which the identified node is a descendent. This is because, as explained above, a changed root hash value will affect the root hash value of every node in the lineage between the root of the tree and the identified node.

Creating the tree data structure can be performed by a server, as can the performing processing (308) using the tree data structure. In a specific example, this processing (308) is performed by the server based on a request from a client device holding a given document to be verified. The verification that the given document is the target document present as part of the collection of documents in the data repository at the point in time can be performed by the client device using the cryptographic proof provided by the server.

The collection of documents can be stored in the data repository separate from the tree data structure, where each node of the tree data structure that has one or more elements corresponding/keyed to one or more documents points to document data of the one or more documents, rather than holds the document data itself. In the verification context, the root hash value for the node having an element corresponding to the target document can be based at least in part on document data of that target document such that modification of the document data of that target document results in a different root hash value of the node and therefore a different root hash value of any parent node from which the node descends. Because of this, if the given document is actually different from the target document, the provided cryptographic proof will demonstrate that the given document is not the target document and the verification that the given document is the target document present as part of the collection of documents in the data repository at the point in time will fail.

Alternatively, the collection of documents can, in some examples, be stored in the tree data structure itself. For each node of the tree data structure, having one or more elements corresponding to one or more documents of the collection of documents, each element of the one or more elements of that node can include the document data of the document to which the element respectively corresponds.

Although various examples are provided, variations are possible without departing from a spirit of the claimed aspects.

Figure 4:
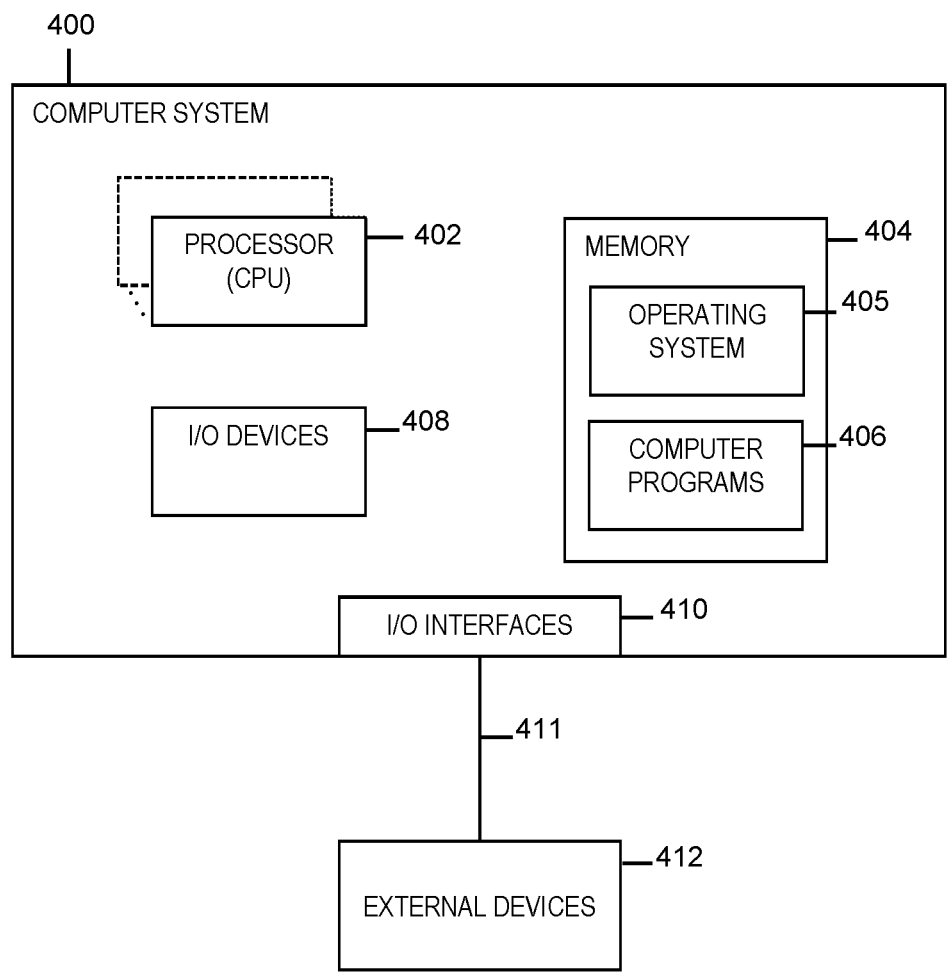
FIG. 4 depicts one example of a computer system and associated devices to incorporate and/or use aspects described herein.

Processes described herein may be performed singly or collectively by one or more computer systems, such as one or more computer system(s) of a database system, as an example. The computer system could be in communication with a database and/or components of a database system. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Additionally, external device(s) 412 may be or include database(s), database system(s), or component(s) of database systems. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
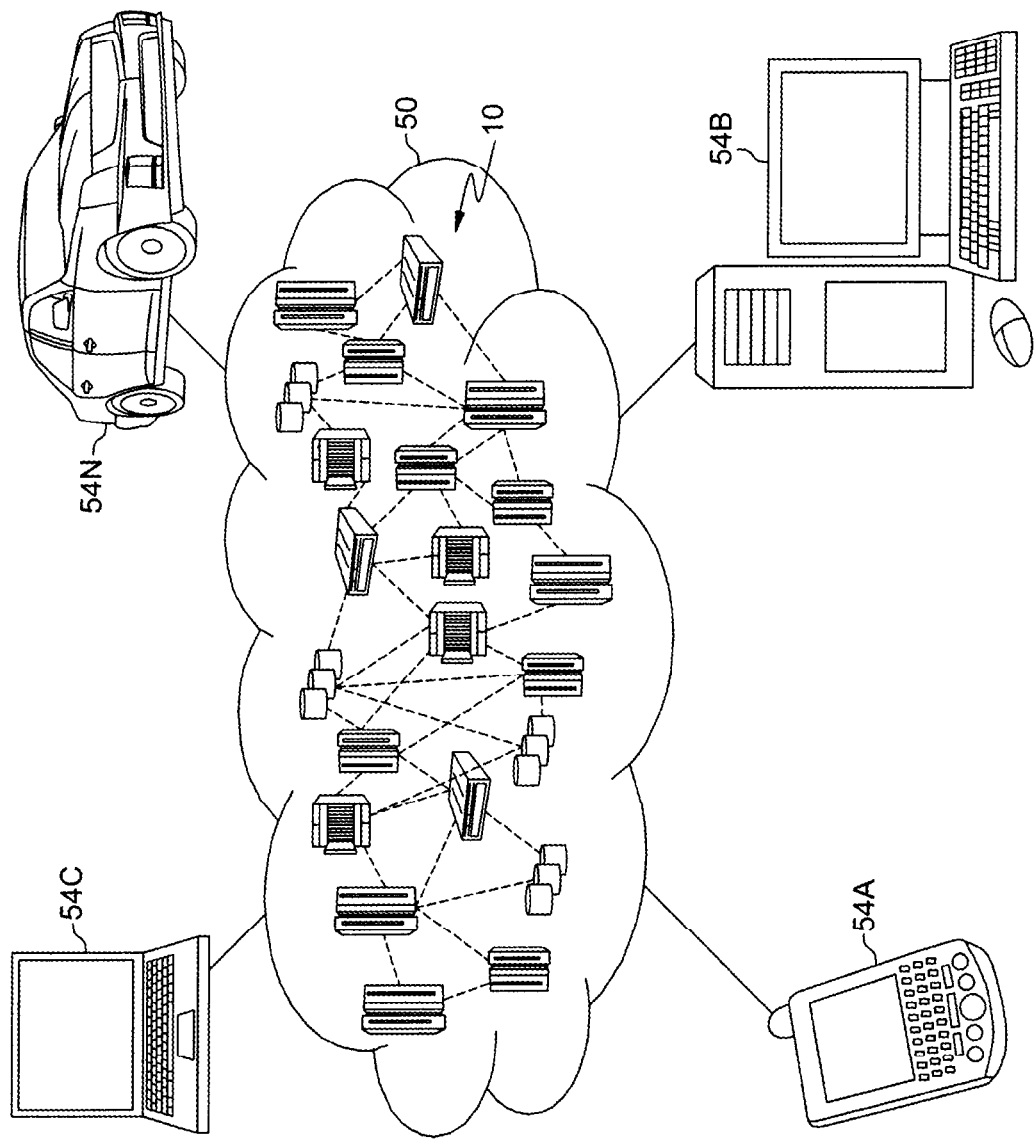
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
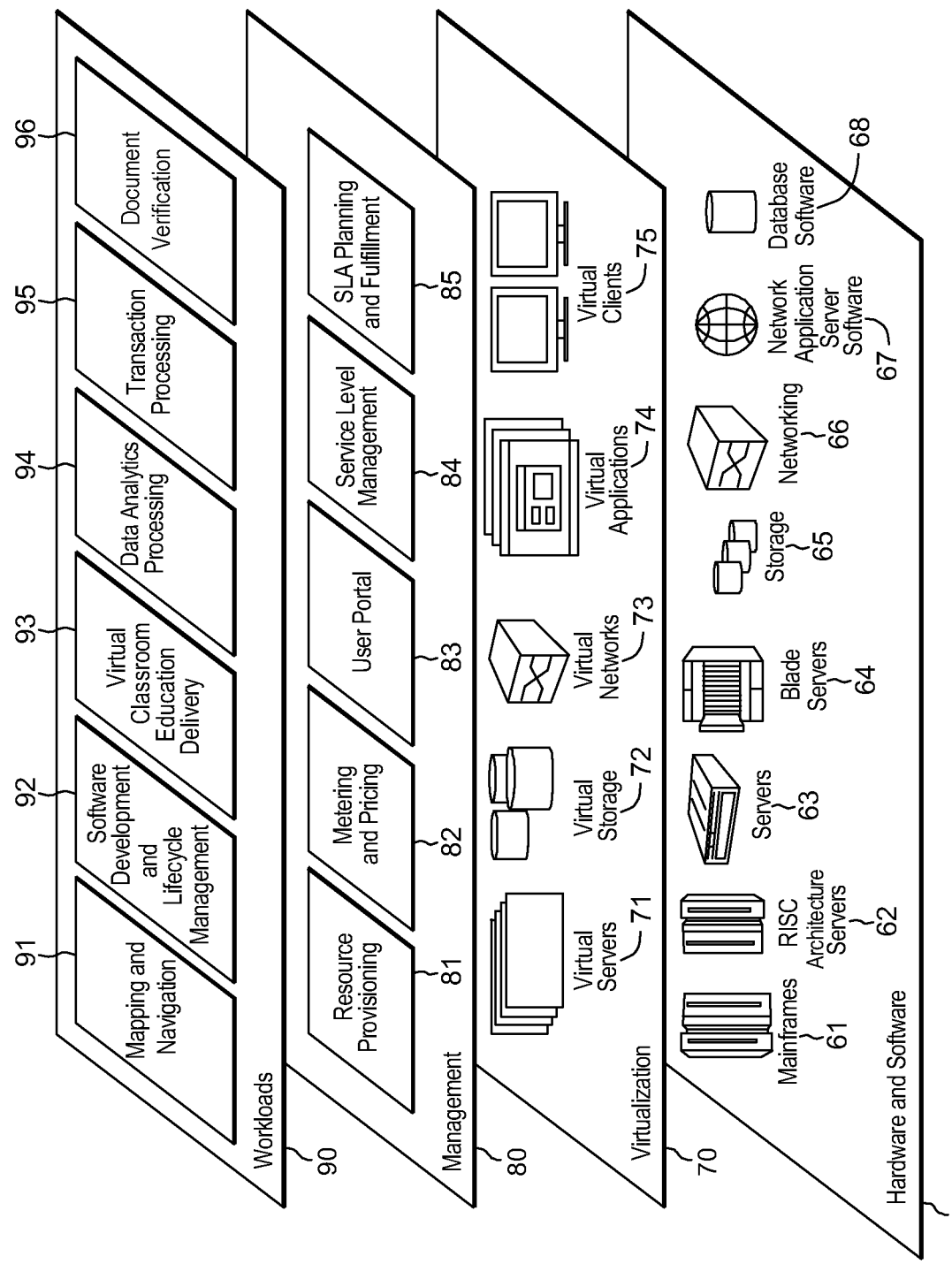
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document verification 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   creating a tree data structure that indexes a collection of documents present in a data repository at a point in time, the tree data structure being stored in memory as a hierarchical data structure comprising a plurality of nodes, the plurality of nodes comprising parent nodes and leaf nodes of the tree data structure;
   determining, for each node of the plurality of nodes, a respective root hash value of that node, wherein:
      each leaf node of the tree data structure comprises a respective one or more elements, each element of the one or more elements of the leaf node being keyed to a corresponding document of the plurality of documents, and the root hash value of the leaf node is determined as a function of at least a respective hash value for each element of the one or more elements, the hash value for an element being based at least in part on a hash of data of the document to which the element corresponds; and
      each parent node of the tree data structure is a parent to a respective one or more child nodes of the plurality nodes, and the root hash value of the parent node is determined as a function of at least the root hash value for each child node of the one or more child nodes of the parent node, and wherein patent nodes of the tree data structure comprise a respective one or more elements each being keyed to a corresponding document of the plurality of documents;
   storing in each parent node of the tree data structure the root hash value for each of the one or more child nodes of that parent node; and
   for a given document that is purported to be a target document of the collection of documents present in the data repository at the point in time, performing processing, using the tree data structure, in facilitating verification that the given document is the target document present as part of the collection of documents in the data repository at the point in time, wherein the performing processing comprises providing a cryptographic proof to demonstrate whether the given document is the target document.

2. The method of claim 1, wherein the tree data structure is rooted at a root node of the tree data structure, wherein the root hash value for the root node represents a hash for the collection of documents at the point in time, wherein an identified node of the tree data structure has an element that is keyed to the target document, and wherein the provided cryptographic proof comprises a plurality of hash values for nodes of the tree data structure, the plurality of hash values being those which, together with the hash value for the element that is keyed to the target document, enable calculation of a root hash value of the root node.

3. The method of claim 2, wherein the plurality of hash values comprises, for each parent node, of the tree data structure, from which the identified node is a descendent, one or more root hash values for one or more child nodes, of that parent node, that is not also a parent node from which the identified node descends.

4. The method of claim 3, wherein the plurality of hash values comprises one or more hash values for one or more elements, other than the element that is keyed to the target document, of the identified node.

5. The method of claim 3, wherein the plurality of hash values comprises, for each parent node of the parent nodes, of the tree data structure, from which the identified node is a descendent, one or more hash values for one or more elements of the parent node.

6. The method of claim 5, wherein the identified node is a parent node having at least one child node, and wherein the plurality of hash values further comprises one or more root hash values for the at least one child node of the identified node.

7. The method of claim 1, wherein the creating the tree data structure is performed by a server and wherein the performing processing using the tree data structure is performed by the server based on a request from a client device holding the given document to be verified, wherein the verification that the given document is the target document present as part of the collection of documents in the data repository at the point in time is performed by the client device using the cryptographic proof provided by the server.

8. The method of claim 1, wherein the collection of documents are stored in the data repository separate from the tree data structure, wherein each node of the tree data structure having one or more elements corresponding to one or more documents points to document data of the one or more documents.

9. The method of claim 8, wherein the root hash value for the node having an element corresponding to the target document is based at least in part on document data of that target document such that modification of the document data of that target document results in a different root hash value of the node and therefore a different root hash value of any parent node from which the node descends, and wherein, based on the given document being different from the target document, the provided cryptographic proof will demonstrate that the given document is not the target document and the verification that the given document is the target document present as part of the collection of documents in the data repository at the point in time will fail.

10. The method of claim 1, wherein the collection of documents are stored in the tree data structure, wherein, for each node of the tree data structure, having one or more elements corresponding to one or more documents of the collection of documents, each element of the one or more elements of that node contains the document to which the element respectively corresponds.

11. The method of claim 1, wherein the hash value for an element of a node is determined based at least on data of the document to which the element corresponds and a time at which the document was stored to the data repository.

12. The method of claim 1, further comprising updating the tree data structure based on a change that performs at least one action selected from the group consisting of: adding and changing a document of the collection of documents, wherein the updating comprises:
 identifying a node of the tree data structure having an element to which the document corresponds;
 determining a new root hash value of the identified node; and
 determining, a respective new root hash value for each parent node, of the tree data structure, from which the identified node is a descendent.

13. A computer system comprising:
 a memory; and
 a processor in communication with the memory, wherein the computer system is configured to perform a method comprising:
  creating a tree data structure that indexes a collection of documents present in a data repository at a point in time, the tree data structure being stored in memory as a hierarchical data structure comprising a plurality of nodes, the plurality of nodes comprising parent nodes and leaf nodes of the tree data structure;
  determining, for each node of the plurality of nodes, a respective root hash value of that node, wherein:
   each leaf node of the tree data structure comprises a respective one or more elements, each element of the one or more elements of the leaf node being keyed to a corresponding document of the plurality of documents, and the root hash value of the leaf node is determined as a function of at least a respective hash value for each element of the one or more elements, the hash value for an element being based at least in part on a hash of data of the document to which the element corresponds; and
   each parent node of the tree data structure is a parent to a respective one or more child nodes of the plurality nodes, and the root hash value of the parent node is determined as a function of at least the root hash value for each child node of the one or more child nodes of the parent node, and wherein parent nodes of the tree data structure comprise a respective one or more elements each being keyed to a corresponding document of the plurality of documents;
  storing in each parent node of the tree data structure the root hash value for each of the one or more child nodes of that parent node; and
  for a given document that is purported to be a target document of the collection of documents present in the data repository at the point in time, performing processing, using the tree data structure, in facilitating verification that the given document is the target document present as part of the collection of documents in the data repository at the point in time, wherein the performing processing comprises providing a cryptographic proof to demonstrate whether the given document is the target document.

14. The computer system of claim 13, wherein the tree data structure is rooted at a root node of the tree data structure, wherein the root hash value for the root node represents a hash for the collection of documents at the point in time, wherein an identified node of the tree data structure has an element that is keyed to the target document, wherein the provided cryptographic proof comprises a plurality of hash values for nodes of the tree data structure, the plurality of hash values being those which, together with the hash value for the element that is keyed to the target document, enable calculation of a root hash value of the root node, wherein the plurality of hash values comprises, for each parent node, of the tree data structure, from which the identified node is a descendent, one or more root hash values for one or more child nodes, of that parent node, that is not also a parent node from which the identified node descends.

15. The computer system of claim 14, wherein the plurality of hash values comprises, for each parent node of the parent nodes, of the tree data structure, from which the identified node is a descendent, one or more hash values for one or more elements of the parent node, wherein the identified node is a parent node having at least one child node, and wherein the plurality of hash values further comprises one or more root hash values for the at least one child node of the identified node.

16. The computer system of claim 13, wherein the collection of documents are stored in the data repository separate from the tree data structure, wherein each node of the tree data structure having one or more elements corresponding to one or more documents points to document data of the one or more documents, wherein the root hash value for the node having an element corresponding to the target document is based at least in part on document data of that target document such that modification of the document data of that target document results in a different root hash value of the node and therefore a different root hash value of any parent node from which the node descends, and wherein, based on the given document being different from the target document, the provided cryptographic proof will demonstrate that the given document is not the target document and the verification that the given document is the target document present as part of the collection of documents in the data repository at the point in time will fail.

17. A computer program product comprising:
 a computer readable storage medium readable by a processing circuit and storing instructions for execution by the processing circuit for performing a method comprising:
  creating a tree data structure that indexes a collection of documents present in a data repository at a point in time, the tree data structure being stored in memory as a hierarchical data structure comprising a plurality of nodes, the plurality of nodes comprising parent nodes and leaf nodes of the tree data structure;

determining, for each node of the plurality of nodes, a respective root hash value of that node, wherein:
  each leaf node of the tree data structure comprises a respective one or more elements, each element of the one or more elements of the leaf node being keyed to a corresponding document of the plurality of documents, and the root hash value of the leaf node is determined as a function of at least a respective hash value for each element of the one or more elements, the hash value for an element being based at least in part on a hash of data of the document to which the element corresponds; and
  each parent node of the tree data structure is a parent to a respective one or more child nodes of the plurality nodes, and the root hash value of the parent node is determined as a function of at least the root hash value for each child node of the one or more child nodes of the parent node, and wherein parent nodes of the tree data structure comprise a respective one or more elements each being keyed to a corresponding document of the plurality of documents;
storing in each parent node of the tree data structure the root hash value for each of the one or more child nodes of that parent node; and
for a given document that is purported to be a target document of the collection of documents present in the data repository at the point in time, performing processing, using the tree data structure, in facilitating verification that the given document is the target document present as part of the collection of documents in the data repository at the point in time, wherein the performing processing comprises providing a cryptographic proof to demonstrate whether the given document is the target document.

18. The computer program product of claim 17, wherein the tree data structure is rooted at a root node of the tree data structure, wherein the root hash value for the root node represents a hash for the collection of documents at the point in time, wherein an identified node of the tree data structure has an element that is keyed to the target document, wherein the provided cryptographic proof comprises a plurality of hash values for nodes of the tree data structure, the plurality of hash values being those which, together with the hash value for the element that is keyed to the target document, enable calculation of a root hash value of the root node, wherein the plurality of hash values comprises, for each parent node, of the tree data structure, from which the identified node is a descendent, one or more root hash values for one or more child nodes, of that parent node, that is not also a parent node from which the identified node descends.

19. The computer program product of claim 18, wherein the plurality of hash values comprises, for each parent node of the parent nodes, of the tree data structure, from which the identified node is a descendent, one or more hash values for one or more elements of the parent node, wherein the identified node is a parent node having at least one child node, and wherein the plurality of hash values further comprises one or more root hash values for the at least one child node of the identified node.

* * * * *